United States Patent [19]
Kinoshita

[11] Patent Number: 5,865,867
[45] Date of Patent: Feb. 2, 1999

[54] PROCESS FOR PRODUCING GRADIENT INDEX OPTICAL ELEMENT

[75] Inventor: Hiroaki Kinoshita, Hachioji, Japan

[73] Assignee: Olympus Optical Co., Ltd., Tokyo, Japan

[21] Appl. No.: 712,290

[22] Filed: Sep. 11, 1996

[30] Foreign Application Priority Data

Sep. 11, 1995 [JP] Japan ..................................... 7-232548

[51] Int. Cl.$^6$ ........................... C03C 15/00; C03C 17/00; C03C 21/00; C03C 23/00
[52] U.S. Cl. .......................... 65/17.3; 65/30.1; 65/30.13; 65/31; 65/440
[58] Field of Search .................................. 65/30.1, 30.13, 65/31, 61, 399, 400, 440

[56] References Cited

U.S. PATENT DOCUMENTS

| | | | |
|---|---|---|---|
| 5,068,208 | 11/1991 | Haun et al. | 65/31 |
| 5,166,827 | 11/1992 | Noda | 359/652 |
| 5,171,344 | 12/1992 | Noda | 65/30.1 |
| 5,182,236 | 1/1993 | Caldwell et al. | 65/31 |
| 5,238,880 | 8/1993 | Inami et al. | 65/30.13 |
| 5,308,802 | 5/1994 | Haun | 65/31 |
| 5,356,840 | 10/1994 | Noda | 65/30.13 |

FOREIGN PATENT DOCUMENTS

| | | |
|---|---|---|
| 62-292624 | 12/1987 | Japan . |
| 4-83719 | 3/1992 | Japan . |
| 4-108626 | 4/1992 | Japan . |
| 4-83719 | 4/1992 | Japan . |
| 5-306126 | 11/1993 | Japan . |
| 6-148405 | 5/1994 | Japan . |
| 63-54652 | 10/1998 | Japan . |

OTHER PUBLICATIONS

Tsuchida et al, "Camera Lens Design Using the GRIN Lens", Microoptics News, vol. 9–3 (1991), pp. 13–18.

Noda et al, "Possibility of GRIN Lens Through Material Design", Japan Optics '92 Extended Abstracts, Sep. 19, 1992, pp. 127–128.

Tsuchida et al, "On the Design of the Optical System Using GRIN Materials", SPIE, vol. 1780 Lens and Optical Systems Design (1992), pp. 456–463.

Caldwell et al, "Design of Gradient–Index Lens Systems for Disc Format Cameras", Applied Optics, vol. 25, No. 18, Sep. 1986, pp. 3351–3355.

*Primary Examiner*—Peter Chin
*Assistant Examiner*—Jacqueline A. Ruller
*Attorney, Agent, or Firm*—Pillsbury Madison & Sutro LLP

[57] ABSTRACT

A porous body containing a silicon component as a starting material of optical element is immersed in a solution containing hydrofluoric acid, taken out from the solution and immersed in a solution containing a metal alkoxide containing a first metal component except silicon or a derivative thereof so that the porous body contains the first metal component in such a concentration gradient that the concentration of the first metal component decreases from a periphery of the porous body toward a center of the porous body. Hydrofluoric acid breaks glass bonds of the porous body, so that the concentration of the first metal component can be securely distributed in a desired gradient. Drying and sintering of the porous body enables producing, for example, a glass having a metal component concentration concavely distributed in its radial direction which is excellent in chromatic aberration suppressing capability. After the immersion in the solution of first metal component, the porous body can be immersed in a solution of second metal component to thereby provide the porous body with a concentration gradient of second metal component.

15 Claims, No Drawings

PROCESS FOR PRODUCING GRADIENT INDEX OPTICAL ELEMENT

BACKGROUND OF THE INVENTION

1. Field of the Invention

The present invention relates to a process for producing a gradient index optical element and a gradient index optical element produced thereby which is suitable for use in optical devices such as a camera, a microscope, an endoscope and an electronic imaging optical system. More particularly, the present invention is concerned with a process for producing a gradient index optical element in which a porous body containing a silicon component is immersed in a solution containing hydrofluoric acid and thereafter in a solution containing a metal alkoxide or derivative thereof and concerned with a gradient index optical element produced thereby.

2. Discussion of Related Art

The gradient index optical element is one whose medium itself has been provided with refractive power by causing the medium to have a refractive index distribution. The gradient index optical element has excellent aberration suppressing capability to thereby enable reducing the number of constituent lenses, so that it is attracting attention as an optical element which is indispensable in next-generation optical systems.

The known gradient index optical elements can be classified as follows, depending on the Abbe's number change and the refractive index change in the radial direction thereof. That is, the gradient index optical element whose refractive index decreases from a glass center to a periphery thereof is designated the gradient index optical element of the positive refractive power type, and the gradient index optical element whose refractive index contrarily increases is designated the gradient index optical element of the negative refractive power type. With respect to the chromatic dispersion accompanying the refractive index change, the chromatic dispersion distribution in which the Abbe's number is decreased with the increase of the refractive index is designated the positive dispersion distribution, the chromatic dispersion distribution in which the Abbe's number is contrarily increased with the increase of the refractive index is designated the negative dispersion distribution and the chromatic dispersion distribution in which the Abbe's number has no substantial change irrespective of the increase of the refractive index is designated the low dispersion distribution. Thus, combinations of the refractive index change and the Abbe's number change give, for example, an optical element of a negative dispersion distribution of the positive refractive power type. The chromatic dispersion distribution in which the refractive index is scarcely changed and the Abbe's number is greatly changed is designated the super dispersion distribution.

In the field of developments of such optical elements, for example, Microoptics News, vol. 9–3, pp. 13–18 (1991), Preprints of papers 127–128 Presented before 1992 Japan Optics Symposium, U.S. Pat. No. 5,166,827 and SPIE, vol. 1780, pp. 456–463 (1992) disclosed that the low or negative dispersion distribution is advantageous in the gradient index optical element of excellent chromatic aberration suppressing capability which is applicable to white light sources. Further, Applied Optics, vol. 25 no. 18, pp. 3351–3355 (1986) described that the gradient index optical element of the negative refractive power type has excellent chromatic aberration suppressing capability. Still further, Japanese Patent Application Laid-Open Specification No. 148405/1994 disclosed the composition realizing the super dispersion distribution. In the production of the above gradient index optical element having excellent chromatic aberration suppressing capability, it is requisite that the concentration of a metal component such as Ti, Nb, Ta or Zr be continuously increased from a glass center toward a periphery thereof, namely, have a concave distribution.

These gradient index optical elements are produced by, for example, the customary sol gel process, ion exchange process or molecular stuffing process. Among these processes, the sol gel process is attracting intense attention because a glass of high aperture ratio can be obtained and a polyvalent metal oxide can be provided with a distribution to thereby enable giving variation to the optical properties of the obtained gradient index optical element.

Japanese Patent Application Laid-Open Specification No. 108626/1992 disclosed a process for producing the gradient index optical element of the negative refractive power type in which a porous body is immersed in a distribution imparting solution and cooled to thereby stop the move of the distribution imparting solution according to the sol gel process. On the other hand, Japanese Patent Application Laid-Open Specification No. 306126/1993 disclosed a process for producing the gradient index optical element of the negative refractive power type in which a metal salt is incorporated in a porous body from its periphery.

Japanese Patent Application Laid-Open Specification No. 55339/1992 disclosed a process comprising immersing a gel containing a first dopant in a suitable leaching solution to thereby provide the first dopant with a distribution, followed by providing a second component with a distribution. Japanese Patent Application Laid-Open Specification No. 292624/1987 described a process for producing $SiO_2$—$TiO_2$ glass in which a porous body is immersed in a Ti-containing solution to thereby cause the porous body to uniformly contain the Ti component. Japanese Patent Application Laid-Open Specification No. 83719/1992 described a process for producing the gradient index optical element of the positive refractive power type in which a wet porous body of $SiO_2$—$TiO_2$ is immersed in a fluorine-containing solution to thereby leach out the Ti component, so that the optical element has a refractive index distribution having a convex profile in the radial direction thereof.

The application of the process of Japanese Patent Application Laid-Open Specification No. 306126/1993 to the production of the gradient index optical element in which a metal component such as Ti, Nb, Ta or Zr having intense influence on the refractive index is provided with a concave distribution in the radial direction of the porous body is difficult because a suitable salt is not available. The terminology "suitable salt" used herein means the salt which can be easily handled, can be dissolved in an available solvent, can easily control chemical reaction and can produce a homogeneous sol when being used as a material of the sol gel process.

The process of Japanese Patent Application Laid-Open Specification No. 108626/1992 has drawbacks in that metal components are precipitated because of substantial changes of the solubilities thereof which occur in accordance with temperature changes, selection of an employed solvent is difficult and further the reproducibility of the resultant refractive index distribution is not good. In the process of Japanese Patent Application Laid-Open Specification No. 55339/1992, the realization of a concave metal concentration distribution is difficult although the first dopant can be easily provided with a convex metal concentration distribution. On the other hand, the use of the process of Japanese Patent Application Laid-Open Specification No. 292624/1987 for reducing the time of immersion in the titanium-containing solution to there-by provide titanium with a concave distribution in the radial direction encounters problems such that not only can only a small proportion of titanium component contribute to the network because of strong Si—O—Si bonds but also part of the titanium component which does not associate with the Si—O—Si bonds aggregates together at the time of sintering of the porous body to thereby cause precipitation of anatase crystals with the result that the obtained optical element is devitrified. The process of Japanese Patent Application Laid-Open Specification No. 83719/1992 has a drawback in that a concave metal concentration distribution cannot be realized although the use of hydrofluoric acid for leaching out the titanium component from the silica titanium gel can naturally provide the titanium with a convex metal concentration distribution.

SUMMARY OF THE INVENTION

It is an object of the present invention to overcome the above drawbacks of the prior art and to provide a desirable process for producing glass from a porous body, especially, a process for producing a gradient index optical element having excellent chromatic aberration suppressing capability in which a metal component concentration is provided with a concave distribution in the radial direction of the optical element according to the sol gel process.

It is another object of the present invention to provide a particular process in which a metal component such as Ti, Nb, Ta or Zr whose suitable salt is not available but whose alkoxide or derivative thereof is present can be provided with a concave concentration distribution in the radial direction of the optical element.

It is a further object of the present invention to provide a gradient index optical element having excellent chromatic aberration suppressing capability which is produced by the above process.

For attaining the above objects, in a primary aspect of the present invention, there is provided a process for producing a gradient index optical element which comprises the steps of:

immersing a porous body containing a silicon component as a starting material of optical element in a solution containing hydrofluoric acid and taking out the porous body from the solution, immersing the porous body taken out in a solution containing a metal alkoxide containing a first metal component except silicon or a derivative thereof so that the porous body contains the first metal component in such a concentration gradient that the concentration of the first metal component decreases from a periphery of the porous body toward a center of the porous body and taking out the porous body from the solution, and drying the porous body taken out and sintering the dried porous body.

In another aspect of the present invention, there is provided a process for producing a gradient index optical element which comprises the steps of:

immersing a porous body containing a silicon component as a starting material of optical element in a solution containing hydrofluoric acid and taking out the porous body from the solution, immersing the porous body taken out in a solution containing a metal alkoxide containing a first metal component except silicon or a derivative thereof so that the porous body contains the first metal component in such a concentration gradient that the concentration of the first metal component decreases from a periphery of the porous body toward a center of the porous body and taking out the porous body from the solution, immersing the porous body taken out in a solution containing a metal salt containing a second metal component except silicon, taking out the porous body from the solution, immersing the porous body taken out in a solution capable of leaching the metal salt so that the porous body contains the second metal component in such a concentration gradient that the concentration of the second metal component increases from a periphery of the porous body toward a center of the porous body and taking out the porous body from the solution, drying the porous body taken out and sintering the dried porous body.

In a further aspect of the present invention, there is provided a process for producing a gradient index optical element which comprises the steps of:

immersing a porous body containing a silicon component as a starting material of optical element in a solution containing hydrofluoric acid and taking out the porous body from the solution, immersing the porous body taken out in a solution containing a metal alkoxide containing a first metal component except silicon or a derivative thereof so that the porous body contains the first metal component in such a concentration gradient that the concentration of the first metal component decreases from a periphery of the porous body toward a center of the porous body and taking out the porous body from the solution, immersing the porous body taken out in a solution containing a metal salt containing a second metal component except silicon, taking out the porous body from the solution, immersing the porous body taken out in a solution in which the metal salt containing the second metal component has a low solubility to thereby fix microcrystals of the metal salt in the porous body, taking out the porous body, immersing the porous body taken out in a solution capable of leaching the metal salt so that the porous body contains the second metal component in such a concentration gradient that the concentration of the second metal component increases from a periphery of the porous body toward a center of the porous body and taking out the porous body from the solution, drying the porous body taken out and sintering the dried porous body.

In still a further aspect of the present invention, there is provided a gradient index optical element which is produced by each of the above processes.

The foregoing and other objects, features and advantages of the present invention will become apparent from the following detailed description and appended claims.

DETAILED DESCRIPTION OF THE INVENTION

Although the silicon-containing porous body as a starting material of optical element for use in the present invention is not particularly limited, preferred use can be made of a gel produced by the customary sol gel process (see, for example, C. J. Brinker et al., Journal of Non-Crystalline Solids, vol. 48, pp. 47–64 (1982)), a soot produced by the customary CVD process (see, for example, T. Izawa et al., IOOC, vol.

77, pp. 375–378 (1977)) or a Vycor glass having continuous pores produced by the customary phase separation process (H. P. Hood et al., U.S. Pat. No. 2,221,709). The gel produced by the sol gel process is especially preferred.

The above porous body is immersed in a solution containing hydrofluoric acid. This solution containing hydrofluoric acid is obtained by mixing hydrofluoric acid with, for example, an organic solvent. Although the type of the organic solvent is not limited as long as it is miscible with hydrofluoric acid, preferred use can be made of an alcohol such as methanol, ethanol, isopropanol or ethoxymethanol or a ketone such as acetone. Ethanol is especially preferred.

The hydrogen fluoride concentration of the solution containing hydrofluoric acid is appropriately regulated depending on the strength of the porous body, i.e., the amount of Si—O—Si bonds in the porous body. The hydrogen fluoride concentration can be relatively low when the porous body is a wet gel having a smaller proportion of Si—O—Si bonds or the like. On the other hand, the hydrogen fluoride concentration should be relatively high when the porous body is a soot having a larger proportion of Si—O—Si bonds or the like. Thus, although it is difficult to indiscriminately determine the hydrogen fluoride concentration of the solution containing hydrofluoric acid, the hydrogen fluoride concentration generally ranges from 0.0001 mol/liter to 0.5 mol/liter, preferably, from 0.001 mol/liter to 0.1 mol/liter. Although the immersion temperature and time should be regulated depending on, for example, the strength of the porous body and the size of the gel, the porous body is generally immersed in the above solution at 0 to 80° C. for a period ranging from several minutes to tens of hours.

The porous body having been immersed in the solution containing hydrofluoric acid and taken out therefrom is immersed in a solution containing a metal alkoxide containing a first metal component except silicon or a derivative thereof. It is preferred that the first metal component be at least one metal selected from the group consisting of Ti, Nb, Ta and Zr.

The metal alkoxide or derivative thereof is preferred to be at least one member selected from the group consisting of a compound consisting of a metal atom and, bonded through an oxygen atom therewith, an alkyl or aryl group, a compound consisting of a metal atom and a β-diketone or β-keto acid ester having an enol-structured oxygen atom bonded with the metal atom, a carboxylic acid derivative containing a metal and a metalloxane polymer. With respect to Ti, examples thereof include $Ti(OC_3H_7)_4$, $Ti(OC_4H_9)_4$, $TiO(C_5H_7O_2)_2$, $Ti(OC_3H_7)_2[(C_5H_7O_2)_4]_2$, $Ti(OC_3H_7)_2[(C_6H_9O_2)_4]_2$, $(iso—C_3H_7O)_2Ti(CH_3COCHCOCH_3)_2$ and $(iso—C_3H_7O)_2TiHOCH_2CH_2N—(CH_2CH_2O)_2$. With respect to Nb, examples thereof include $Nb(OC_2H_5)_5$, $Nb(OC_3H_7)_5$, $Nb(OC_4H_9)_5$, $NbO(C_5H_7O_2)_3$, $Nb(OC_3H_7)_3[(C_5H_7O_2)_4]_2$, $Nb(OC_3H_7)_3—[(C_6H_9O_2)_4]_2$ and $Nb(C_5H_7O_2)_5$. With respect to Ta, examples thereof include $Ta(OC_2H_5)_5$, $Ta(OC_3H_7)_5$, $Ta(OC_4H_9)_5$ and $Ta(C_5H_7O_2)_5$. With respect to Zr, examples thereof include $Zr(OC_2H_5)_4$, $Zr(OC_3H_7)_4$, $Zr(OC_4H_9)_4$, $Zr(C_5H_7O_2)_4$ and $Zr(C_5H_7O_2)_2(C_6H_9O_2)_2$.

When charged in excess, the metal component such as Ti, Nb, Ta or Zr aggregates to thereby work as a nucleating agent. This leads to glass crystallization or devitrification. Thus, the concentration and type of the solution containing the above metal component should be selected taking into account the desired profile of metal component concentration distribution and the condition of the porous body. Experimental results showed that the concentration of metal alkoxide or derivative thereof ensuring the prevention of nonuniform cluster generally ranges from 0.0001 to 0.8 mol/l, preferably, from 0.01 to 0.3 mol/l. This is because, with respect to, for example, Ti, at about 0.005 mol/liter the surface of the porous body is likely to suffer from bloom (precipitation of coarse cluster) at the stage of drying. Although the immersion temperature and time should be regulated depending on, for example, the strength and size of the porous body, the porous body is generally immersed in the above solution at 0° to 80° C. for a period ranging from several minutes to several hours.

As a result of this immersion, such a concentration gradient is formed that the concentration of the first metal component decreases from a periphery of the porous body toward a center of the porous body. According to necessity, the porous body is immersed in, for example, alcohol or acetone to thereby fix the formed metal concentration gradient. The porous body thus provided with the concentration gradient is dried and sintered. The drying and sintering of the porous body can be conducted according to the customary procedure. The drying of the porous body is generally conducted at 80° C. or higher, preferably, 150° C. or higher for tens of hours to tens of days, preferably, about several days. With respect to the sintering, an appropriate sintering schedule up to temperature at which the porous body becomes nonporous is set depending on the composition of the porous body. As a result of this sintering, the desired gradient index optical element can be obtained.

In the process of the present invention, also, the gradient index optical element can be produced by the steps of:

immersing a porous body containing a silicon component as a starting material of optical element in a solution containing hydrofluoric acid and taking out the porous body from the solution, immersing the porous body taken out in a solution containing a metal alkoxide containing a first metal component except silicon or a derivative thereof so that the porous body contains the first metal component in such a concentration gradient that the concentration of the first metal component decreases from a periphery of the porous body toward a center of the porous body and taking out the porous body from the solution, immersing the porous body taken out in a solution containing a metal salt containing a second metal except silicon, taking out the porous body from the solution, immersing the porous body taken out in a solution capable of leaching the metal salt so that the porous body contains the second metal component in such a concentration gradient that the concentration of the second metal component increases from a periphery of the porous body toward a center of the porous body and taking out the porous body from the solution, drying the porous body taken out and sintering the dried porous body.

The second metal component is preferred to be at least one member selected from the group consisting of Ba, La, Gd, Sr, Ca, Ge, Zr, Y, Zn and In and examples of acid radicals capable of forming salts in cooperation therewith include organic acid radicals such as acetate, citrate, maleate and oxalate and inorganic acid radicals such as nitrate, chloride and nitrite. Although the solvent is not particularly limited as long as it can dissolve the metal salt, preferred use is made of an organic solvent such as methanol, ethanol, isopropanol or methoxymethanol, water, an organic acid, an inorganic acid, an alkali or a mixture thereof. The solvent is especially preferred to be a mixture of an organic solvent and an organic or inorganic acid.

Although the concentration of the metal salt in the solution should be set depending on the concentration of metal component provided in the porous body and cannot be sweepingly stated, it generally ranges from 0.01 to 1 mol/liter, preferably, from 0.05 to 0.5 mol/liter. At this stage, the porous body is generally immersed in the above solution at 0° to 80° C., preferably, 30° to 60° C. for a period ranging from tens of minutes to several days.

According to necessity, after the immersion of the porous body in the solution containing the metal salt containing the second metal component except silicon and before the leaching treatment, the porous body taken out may be immersed in a solution (for example, acetone solution) in which the metal salt containing the second metal component has a low solubility to thereby uniformly fix microcrystals of the metal salt in the porous body.

The solution capable of leaching the metal salt containing the second metal component is preferred to be a solution containing at least one member selected from among alkali elements such as potassium, lithium, sodium and rubidium. This immersion of the porous body in the above solution forms such a concentration gradient that the concentration of the second metal component increases from a periphery of the porous body toward a center of the porous body. At this stage, also, the porous body is generally immersed in the above solution at 0° to 80° C., preferably, 30 to 60° C. for a period ranging from tens of minutes to several days. After the immersion, the porous body is dried and sintered. These can be performed in the same manner as mentioned above.

The function of the invention as recited in claim 1 will be described with respect to the production of an $SiO_2$—$TiO_2$ gradient index optical element of the negative refractive power type having high dispersion distribution in which the titanium component has a concave concentration distribution.

A silicon alkoxide such as tetramethoxysilane, an alcohol such as ethanol, water and an acid are mixed together to thereby obtain a porous body of wet silica gel. Separately, an aqueous solution of hydrogen fluoride (hereinafter simply referred to as "hydrofluoric acid") and an organic solvent such as an alcohol are mixed together to thereby obtain a hydrofluoric acid solution. Immersion of the porous body in this hydrofluoric acid solution causes the hydrofluoric acid solution to diffuse into the porous body. As a result of this diffusion, part of stable Si—O—Si bonds are broken by hydrofluoric acid in the $SiO_2$ skeleton of the porous body, so that, for example, Si—F is newly formed or Si—O is increased. The F or O comes to have some charges with the result that the number of reactive end groups is increased.

The distribution of the above reactive groups in the porous body can be controlled by the duration during which the porous body is immersed in the hydrofluoric acid solution. That is, when the duration during which the porous body is immersed in the hydrofluoric acid solution is short, the diffusion of the hydrofluoric acid solution from the periphery of the porous body causes the porous body to have a gradient of hydrofluoric acid concentration therein. The hydrofluoric acid diffuses while breaking Si—O—Si bonds, so that such a reactive group distribution is formed that the number of reactive groups is large at the periphery of the porous body and small at the center of the porous body. On the other hand, when the duration during which the porous body is immersed in the hydrofluoric acid solution is long, the hydrofluoric acid solution completes its diffusion in the porous body, so that the hydrofluoric acid is uniformly present in the porous body. However, the hydrofluoric acid diffuses while breaking part of Si—O—Si bonds from the periphery of the porous body and thus consuming fluoride ions, so that such a reactive group distribution is formed that the number of reactive groups is slightly large at the periphery of the porous body and slightly small at the center of the porous body. Naturally, the above reaction depends on the fluorine concentration of hydrofluoric acid solution, solvent, components of porous body, etc.

Thereafter, when the porous body of wet gel having been treated with the hydrofluoric acid is immersed in, for example, a solution containing a titanium alkoxide, the titanium component gradually diffuses from the periphery of the porous body toward the center thereof to thereby have some charges, so that it reacts with reactive end groups such as Si—F and Si—O to thereby form Si—O—Ti bonds. Therefore, such a concave distribution is formed that the concentration of the titanium component is high at the periphery of the porous body and low at the center thereof. The drying and sintering of this porous body as it is enables obtaining a gradient index glass of the negative refractive power type having high dispersion distribution, which glass has such a concave distribution that the refractive index is low at the center of the glass and high at the periphery thereof.

The function of the invention as recited in claims 2–3 will be described with respect to the production of an $SiO_2$—$TiO_2$—$BaO$—$K_2O$ gradient index glass of the positive refractive power type having low or negative dispersion distribution or super dispersion distribution, in which the titanium component has a concave concentration distribution and the barium component has a convex concentration distribution.

The following treatment is conducted after the above formation of the concave distribution of the titanium component in the porous body of wet gel. That is, the porous body is immersed in an aqueous or alcohol solution containing barium to thereby impregnate the porous body with the metal salt. Then, the porous body is immersed in, for example, an alcohol to thereby cause microcrystals of the metal salt to precipitate. The resultant porous body is immersed in a potassium-containing distribution imparting solution capable of dissolving barium to thereby provide the porous body with a convex distribution of barium component and a concave distribution of potassium component.

The obtained porous body is immersed in a distribution fixing solution such as an acetone solution in which the metal salt is not dissolved.

As a result, the obtained porous body has the concave distribution of titanium component, convex distribution of barium component and concave distribution of potassium component. A gradient index optical element of low or negative dispersion distribution or super dispersion distribution can be obtained by drying and sintering this porous body. When the negative refractive power attributed to the concave distribution profile of titanium component nearly balances with the positive refractive power attributed to the convex distribution profile of barium component, there is obtained a glass of super dispersion distribution whose refractive power is slight and whose dispersion only has a large change. On the other hand, when the positive refractive power attributed to the convex distribution profile of barium component is superior, there is obtained a gradient index glass having the positive refractive power.

In the above obtained gel, the titanium component reacts with the gel skeleton, so that titanium clusters have a less tendency toward aggregation. A transparent glass can easily be obtained without the crystallization of titanium component by drying and sintering this gel. Therefore, not only can the porous body be provided with the concave concentration distribution of titanium component whose incorporation into the porous body has been impracticable in the prior art but also the titanium component can be introduced in the porous body in a large amount.

The porous body having a metal salt introduced in the gel prior to the immersion in the hydrofluoric acid solution is not suitable from the viewpoint that barium, lanthanum and other various metal salts readily react with hydrofluoric acid to thereby form fluoride salts which are insoluble in water or an organic solvent, so that coarse crystals are precipitated in the gel with the result that cracking and other problems are caused, although should not be indiscriminately stated because various parameters such as the type of metal salt, the solvent and the amount of solution affect the above.

The optical properties such as refractive index and dispersion depends on the metal component of glass. Thus, suitable element combination must be effected in the above gradient index optical element having excellent chromatic aberration suppressing capability. For example, the realization of concave distribution requires that the metal species be a metal alkoxide containing at least one member selected from among Ti, Nb, Ta and Zr or a derivative thereof. On the other hand, the realization of convex distribution requires that the metal species be a metal salt containing at least one member selected from among Ba, La, Gd, Sr, Ca, Ge, Zr, Y, Zn and In. Gradient index optical elements of low or negative dispersion distribution and super dispersion distribution can be obtained by combining and distributing the above metal species.

The gel produced by the sol gel process has been described. However, the porous body for use in the present invention is not limited thereto, and it may be, for example, a soot produced by the process known as "CVD process" or a Vycor glass produced by the customary phase separation process. Addition in advance of a metal species other than silicon and titanium, for example, zirconium in the preparation of the porous body enables obtaining a glass body having an increased number of components, so that its value can be increased by the improvement of weather and acid resistances. Further, in the preparation of the porous body, the incorporation in advance of metal components to be provided with distributions enables increasing the metal component contents.

In addition, the composition suitable for realizing the gradient index optical element of super dispersion distribution comprises, for example, a three-component system of $SiO_2$—$ZrO_2$—$TiO_2$ in which the Zr component and the Ti component are provided with convex and concave concentration distributions, respectively. This can be obtained by preparing a two-component porous body of $SiO_2$—$ZrO_2$ in advance, providing the Zr component with a convex metal concentration distribution by the use of an acid such as sulfuric acid, washing away the acid with, for example, an alcohol, immersing the porous body in hydrofluoric acid to thereby selectively leach out silica and immersing the resultant porous body in a solution containing Ti.

It is advantageous to immerse the porous body in an organic solvent such as an alcohol at least once, preferably, at least twice after the preparation of the porous body comprising the first metal component provided with the concave distribution. This is because, when the amount of hydrofluoric acid contained in the porous body is relatively large, a large proportion of metal component such as barium or lanthanum introduced as a metal salt afterwards easily reacts with hydrofluoric acid to thereby form fluoride salts which are insoluble in water and an organic solvent. The washing of the porous body with an organic solvent enables washing away the hydrofluoric acid remaining in the porous body, so that such a metal component precipitation can be prevented. The organic solvent should be selected from among those in which the metal species has such a solubility that the metal concentration distribution formed in the porous body would not lose its shape. Examples of suitable organic solvents include alcohols such as n—$C_3H_7OH$, iso—$C_3H_7OH$, n—$C_4H_9OH$, sec—$C_4H_9OH$ and t—$C_4H_9OH$, ketones such as acetone and methyl ethyl ketone, solutions obtained by mixing these and mixtures thereof with organic and inorganic acids. The gradient index optical element provided with varied optical properties of glass can be obtained by effecting various measures as mentioned above.

As apparent from the foregoing, the present invention enables producing glass from the porous body, especially, enables producing the gradient index optical element having excellent chromatic aberration suppressing capability in which the metal component concentration is concavely distributed in the radial direction of the optical element according to the sol gel process. Further, the present invention enables concavely distributing in the radial direction the metal component concentration such that the metal salt is not present but the metal alkoxide is present with respect to, for example, Ti, Nb, Ta and Zr.

PREFERRED EMBODIMENT OF THE INVENTION

The present invention will now be illustrated in greater detail with reference to the following Examples and Comparative Examples, which should not be construed as limiting the scope of the invention.

EXAMPLE 1

Tetramethoxysilane of the formula $Si(OCH_3)_4$ and titanium diisopropoxy(bis-2,4-pentanedionate) of the formula (iso—$C_3H_7O)_2Ti(CH_3COCHCOCH_3)_2$ were used as silicon and titanium source materials, respectively.

35 ml of ethanol, 4.8 ml of 2N hydrochloric acid and 15 ml of water were added to 20.9 g of $Si(OCH_3)_4$ and agitated at room temperature for 1 hr. The thus obtained sol was cast in 40 polypropylene containers of 12 mm in diameter, allowed to stand still in a 40° C. thermostat to thereby effect gelation and aged. The resultant wet gel was taken out from the containers and immersed in an ethanol solution containing 0.01 mol/liter hydrofluoric acid for 4 hr.

The gel was taken out and immersed in a solution consisting of a mixture of 24 g of (iso—$C_3H_7O)_2Ti$—$(CH_3COCHCOCH_3)_2$, 35 ml of ethanol and 16 ml of acetic acid under agitation for 5 hr. The gel was immersed in isopropanol, dried by heating to 150° C. for 5 days and sintered by heating to 1100° C. for 5 days. Thus, a gradient index optical element of the negative refractive power type was obtained.

EXAMPLE 2

Tetramethoxysilane of the formula $Si(OCH_3)_4$, titanium butoxide monomer of the formula $Ti(O-nC_4H_9)_4$, barium acetate of the formula $Ba(OCOCH_3)_2$ and potassium acetate of the formula $KOCOCH_3$ were used as silicon, titanium, barium and potassium source materials, respectively.

35 ml of ethanol, 4.8 ml of 2N hydrochloric acid and 15 ml of water were added to 20.9 g of $Si(OCH_3)_4$ and agitated at room temperature for 1 hr. The thus obtained sol was cast in 40 polypropylene containers of 12 mm in diameter, allowed to stand still in a 40° C. thermostat to thereby effect gelation and aged. The resultant wet gel was taken out from the containers and immersed in an ethanol solution containing 0.01 mol/liter hydrofluoric acid for 4 hr.

The gel was taken out and immersed in a solution consisting of a mixture of 12 g of $Ti(O-nC_4H_9)_4$, 35 ml of ethanol and 16 ml of acetic acid under agitation for 5 hr. The gel was immersed in ethanol and then in a solution obtained by dissolving 0.2 mol/liter barium acetate and 0.1 mol/liter lactic acid in methanol for 24 hr. Further, the gel was immersed in an ethanol solution containing 0.1 mol/liter lactic acid for 24 hr to thereby fix the barium salt in pores of the gel. Subsequently, the gel was immersed in a solution obtained by dissolving 0.15 mol/liter potassium acetate and 0.08 mol/liter lactic acid in methanol for 7 hr. Thereafter, the gel was further immersed in acetone for 24 hr. The gel was dried by heating to 150° C. for 15 days and sintered by heating to 710° C. for 5 days to thereby obtain a glass body. The composition of the glass body was analyzed in the radial direction thereof by EDX (Energy Dispersion X-ray Spectral Analysis). Thus, it was found that a gradient index optical element of desired negative dispersion distribution having a concave metal concentration distribution with respect to titanium component and a convex metal concentration distribution with respect to barium component was obtained.

COMPARATIVE EXAMPLE 1

A glass was produced by treating the gel in the same manner as in Example 2, except that a hydrochloric acid solution was used in place of the hydrofluoric acid solution. In the obtained glass, the titanium component had a concentration distribution which was nearly flat but exhibited partial localization of Ti relative to the silica component in the radial direction of the glass. Thus, a gradient index glass of desired negative dispersion distribution could not be obtained.

EXAMPLE 3

Tetramethoxysilane of the formula $Si(OCH_3)_4$, titanium butoxide monomer of the formula $Ti(O-nC_4H_9)_4$, barium acetate of the formula $Ba(OCOCH_3)_2$ and potassium acetate of the formula $KOCOCH_3$ were used as silicon, titanium, barium and potassium source materials, respectively.

35 ml of ethanol and 4.8 ml of 2N hydrochloric acid were added to 20.9 g of $Si(OCH_3)_4$ and agitated at room temperature for 1 hr. Further, 5 g of $Ti(O-nC_4H_9)_4$ and 10 ml of ethanol and then 15 ml of water were added and agitated at room temperature for 1 hr. The thus obtained sol was cast in 40 polypropylene containers of 12 mm in diameter, allowed to stand still in a 40° C. thermostat to thereby effect gelation and aged. The resultant wet gel was taken out from the containers and immersed in an ethanol solution containing 0.01 mol/liter hydrofluoric acid for 4 hr.

The gel was taken out and immersed in a solution consisting of a mixture of 12 g of $Ti(O-nC_4H_9)_4$, 35 ml of ethanol and 16 ml of acetic acid under agitation for 5 hr. The gel was immersed in ethanol and then in a solution obtained by dissolving 0.3 mol/liter barium acetate and 0.1 mol/liter lactic acid in methanol for 24 hr. Further, the gel was immersed in an ethanol solution containing 0.1 mol/liter lactic acid for 24 hr to thereby fix the barium salt in pores of the gel. Subsequently, the gel was immersed in a solution obtained by dissolving 0.15 mol/liter potassium acetate and 0.08 mol/liter lactic acid in methanol for 7 hr. Thereafter, the gel was further immersed in acetone for 24 hr. The gel was dried by heating to 150° C. for 15 days and sintered by heating to 670° C. for 5 days to thereby obtain a glass body. Thus, there was obtained a gradient index optical element of desired negative dispersion distribution having a concave metal concentration distribution with respect to titanium component and a convex metal concentration distribution with respect to barium component, which gradient index optical element had a titanium content greater than in Example 2.

EXAMPLE 4

Soot prepared from silicon tetrachloride and aluminum chloride was immersed in an ethanol solution containing 0.1 mol/liter hydrofluoric acid for 4 hr. The resultant soot was immersed in an isopropanol solution containing 0.05 mol/liter niobium butoxide and 0.05 mol/liter N-ethyldiethanolamine under agitation for 7 hr. This soot was washed thrice with the use of solution consisting of a 5:5 by volume mixture of isopropanol and acetone, acetone and acetone in sequence. Thereafter, the soot was immersed in a methanol solution containing 0.05 mol/liter lanthanum acetate and 6 mol/liter acetic acid for 24 hr. The soot was immersed in ethanol for 24 hr to thereby fix the lanthanum salt in pores of the soot. The resultant soot was immersed in a 5:5 by volume methanol and water solution of sodium nitrate for 4 hr and then in acetone for 24 hr. The soot was dried and sintered to thereby obtain a glass body. The composition of the glass body was analyzed in the radial direction thereof by EDX. Thus, it was found that a gradient index optical element of desired negative dispersion distribution having a concave metal concentration distribution with respect to niobium component and a convex metal concentration distribution with respect to lanthanum component was obtained.

COMPARATIVE EXAMPLE 2

The soot was treated in the same manner as in Example 4, except that the soot was not washed with the isopropanol/ acetone solution and acetone. Devitrification resulting in white color occurred during the sintering of the soot after the drying. The reason is believed to be that the fluorine component of the soot reacted with the lanthanum component to thereby form an insoluble salt, which caused devitrification at the heat treatment.

As apparent from the above, the gel immersion for washing away hydrofluoric acid was not conducted in Examples 1 and 2 while the above gel immersion was conducted in Examples 3 and 4. Improved results might be obtained by the gel immersion for washing away hydrofluoric acid, depending on the type and amount of added element. Comparative Example 2 was presented for showing what difference would be brought about by the above gel immersion in the case where improved results were realized thereby.

EXAMPLE 5

Tetraethoxysilane of the formula $Si(OC_2H_5)_4$, titanium propoxide of the formula $Ti(O-nC_3H_7)_4$ and zirconium butoxide of the formula $Zr(O-nC_4H_9)_4$ were used as silicon, titanium and zirconium source materials, respectively.

35 ml of ethanol and 4.8 ml of 2N hydrochloric acid were added to 25 g of $Si(OC_2H_5)_4$ and agitated at room temperature for 1 hr. Then, 12 g of $Zr(O-nC_4H_9)_4$ and 10 ml of ethanol and further 15 ml of water were added and agitated at room temperature for 1 hr. The thus obtained sol was cast in 40 polypropylene containers of 12 mm in diameter, allowed to stand still in a 40° C. thermostat to thereby effect gelation and aged. The resultant wet gel was taken out from the containers, treated with 2N sulfuric acid to leach out zirconia component and immersed in ethanol.

The thus obtained gel was immersed in an ethanol solution containing 0.05 mol/liter hydrofluoric acid for 4 hr, taken out and immersed in a solution consisting of a mixture of 12 g of $Ti(O-nC_3H_7)_4$, 35 ml of ethanol and 16 ml of acetic acid under agitation for 5 hr. The gel was immersed in ethanol, dried and sintered. Thus, there was obtained a gradient index optical element of desired super dispersion distribution having a convex metal concentration distribution with respect to zirconium component and a concave metal concentration distribution with respect to titanium component (analyzed by EDX). As a result of acid and alkali resistance tests, it was found that this gradient index optical element was a glass being excellent in chemical resistances such as acid and alkali resistances. This was attributed to the absence of alkali and alkaline earth metals in the gradient index optical element.

EXAMPLE 6

Tetramethoxysilane of the formula $Si(OCH_3)_4$, tantalum propoxide of the formula $Ta(OC_3H_7)_5$, strontium acetate hemihydrate of the formula $Sr(OCOCH_3)_2 \cdot 0.5H_2O$ and sodium acetate of the formula $NaOCOCH_3$ were used as silicon, tantalum, strontium and sodium source materials, respectively.

17 ml of ethanol, 4.8 ml of 2N hydrochloric acid and 15 ml of water were added to 20.9 g of $Si(OCH_3)_4$ and agitated at room temperature for 1 hr. The thus obtained sol was cast in 10 polypropylene containers of 18 mm in diameter, allowed to stand still in a 30° C. thermostat to thereby effect gelation and aged. The resultant wet gel was taken out from the containers and immersed in an ethanol solution containing 0.05 mol/liter hydrofluoric acid for 6 hr. The gel was taken out and immersed in an isopropanol solution containing 0.05 mol/liter tantalum propoxide to thereby provide a concave tantalum concentration distribution in the gel. The gel was immersed in ethanol and then in a solution consisting of a 5:5 by volume mixture of a 1M aqueous strontium acetate solution and 17N acetic acid for 24 hr. Further, the gel was immersed in ethanol to thereby fix microcrystals of strontium acetate in the gel. Subsequently, the gel was immersed in a solution obtained by mixing 50 g of sodium acetate, 400 ml of methanol and 400 ml of ethanol together for 8 hr to thereby provide a convex strontium concentration distribution in the gel.

Thereafter, the gel was further immersed in acetone for 24 hr, dried and sintered. Thus, there was obtained a gradient index optical glass of desired low dispersion distribution having a concave metal concentration distribution with respect to tantalum component and a convex metal concentration distribution with respect to strontium component (metal concentration distribution analyzed by EDX).

What is claimed is:

1. A process for producing a gradient index optical element which comprises the steps of:
   (a) immersing a silica-containing wet gel prepared by gelling a silica sol prepared from a solution of a silicon alkoxide as a starting material of optical element in a solution containing hydrofluoric acid and taking out the wet gel from the solution,
   (b) thereafter immersing the wet gel taken out in a solution containing a metal alkoxide containing a first metal component except silicon or a derivative thereof so that the wet gel contains the first metal component in such a concentration gradient that the concentration of the first metal component decreases from a periphery of the wet gel toward a center of the wet gel, forming a concave concentration distribution and taking out the wet gel from the solution, and
   (c) drying the wet gel taken out to thereby obtain a dry gel and sintering the dry gel to obtain said gradient index optical element.

2. A process for producing a gradient index optical element which comprises, in the order set forth, the steps of:
   (a) immersing a silica-containing wet gel prepared by gelling a silica sol prepared from a solution of a silicon alkoxide as a starting material of optical element in a solution containing hydrofluoric acid and taking out the wet gel from the solution,
   (b) thereafter immersing the wet gel taken out in a solution containing a metal alkoxide containing a first metal component except silicon or a derivative thereof so that the wet gel contains the first metal component in such a concentration gradient that the concentration of the first metal component decreases from a periphery of the wet gel toward a center of the wet gel, forming a concave concentration distribution and taking out the wet gel from the solution,
   (c) immersing the wet gel taken out in a solution containing a metal salt containing a second metal component except silicon, taking out the wet gel from the solution, immersing the wet gel taken out in a solution capable of leaching the metal salt so that the wet gel contains the second metal component in such a concentration gradient that the concentration of the second metal component increases from a periphery of the wet gel toward a center of the wet gel, forming a convex concentration distribution and taking out the wet gel from the solution, and
   (d) drying the wet gel taken out to thereby obtain a dry gel and sintering the dry gel to obtain said gradient index optical element.

3. A process for producing a gradient index optical element which comprises, in the order set forth, the steps of:
   (a) immersing a silica-containing wet gel prepared by gelling a silica sol prepared from a solution of a silicon alkoxide as a starting material of optical element in a solution containing hydrofluoric acid and taking out the wet gel from the solution,
   (b) thereafter immersing the wet gel taken out in a solution containing a metal alkoxide containing a first metal component except silicon or a derivative thereof so that the wet gel contains the first metal component in such a concentration gradient that the concentration of the first metal component decreases from a periphery of the wet gel toward a center of the wet gel, forming a concave concentration distribution and taking out the wet gel from the solution,
   (c) immersing the wet gel taken out in a solution containing a metal salt containing a second metal component except silicon, taking out the wet gel from the solution, immersing the wet gel taken out in a solution in which the metal salt containing the second metal component has a low solubility to thereby fix the metal salt in the wet gel, taking out the wet gel, immersing the wet gel taken out in a solution capable of leaching the metal salt so that the wet gel contains the second metal component in such a concentration gradient that the concentration of the second metal component increases from a periphery of the wet gel toward a center of the wet gel, forming a convex concentration distribution and taking out the wet gel from the solution, and (d) drying the wet gel taken out to thereby obtain a dry gel and sintering the dry gel to obtain said gradient index optical element.

4. The process according to claim 1, 2 or 3, wherein the first metal component except silicon contains at least one metal selected from the group consisting of Ti, Nb, Ta and Zr.

5. The process according to claim 1, 2 or 3, wherein the metal alkoxide or derivative thereof is at least one member selected from the group consisting of a compound consisting of a metal atom and, bonded through an oxygen atom therewith, an alkyl or aryl group, a compound consisting of a metal atom and a β-diketone or β-keto acid ester having an enol-structured oxygen atom bonded with the metal atom, a carboxylic acid derivative containing a metal and a metalloxane polymer.

6. The process according to claim 1, 2 or 3, wherein the solution containing hydrofluoric acid is a solution obtained by mixing hydrofluoric acid with an organic solvent.

7. The process according to claim 6, wherein the organic solvent is ethanol.

8. The process according to claim 1, 2 or 3, wherein the solution containing hydrofluoric acid has a hydrogen fluoride concentration ranging from 0.0001 mol/liter to 0.5 mol/liter.

9. The process according to claim 8, wherein the hydrogen fluoride concentration of the solution containing hydrofluoric acid ranges from 0.001 mol/liter to 0.1 mol/liter.

10. The process according to claim 2 or 3, wherein the second metal component except silicon is at least one member selected from the group consisting of Ba, La, Gd, Sr, Ca, Ge, Zr, Y, Zn and In.

11. The process according to claim 2 or 3, wherein the solution capable of leaching the metal salt of the second metal component is a solution of at least one member selected from the group consisting of lithium, sodium, rubidium, and potassium.

12. The process according to claim 1, 2 or 3, wherein the solution containing the metal alkoxide or derivative thereof has a concentration of metal alkoxide or derivative thereof ranging from 0.0001 mol/liter to 0.8 mol/liter.

13. The process according to claim 12, wherein the concentration of metal alkoxide or derivative thereof in the solution containing the metal alkoxide or derivative thereof ranges from 0.01 mol/liter to 0.3 mol/liter.

14. The process according to claim 1, 2 or 3, wherein a wet gel immersion for washing away hydrofluoric acid is conducted between the step of providing the first metal component with the concentration gradient (b) and the subsequent step (c).

15. The process according to claim 1, 2 or 3, wherein the solution containing hydrofluoric acid has a hydrogen fluoride concentration ranging from 0.0001 mol/liter to 0.05 mol/liter.

* * * * *